United States Patent
Kraemer et al.

[15] 3,652,310
[45] Mar. 28, 1972

[54] METHOD OF PRODUCING LIGHTWEIGHT, HEAT-INSULATING CONSTRUCTION ELEMENTS FROM LIME AND SILICATE AND PRODUCTS THEREOF

[72] Inventors: Stefan Kraemer, Essen; Alois Seidl, Thurnstein; Michael Seger, Krefeld, all of Germany

[73] Assignee: Wasag-Chemie Aktiengesellschaft, Essen, Germany

[22] Filed: Feb. 3, 1970

[21] Appl. No.: 8,435

[30] Foreign Application Priority Data

Feb. 18, 1969 Germany .................P 19 08 049.0

[52] U.S. Cl. ................................106/120, 106/40 R, 106/75
[51] Int. Cl. .........................................................C04b 15/12
[58] Field of Search....................................106/120, 40 R, 75

[56] References Cited

UNITED STATES PATENTS

| | | | |
|---|---|---|---|
| 2,517,235 | 8/1950 | Pierce | 106/120 |
| 2,698,256 | 12/1954 | Sher et al. | 106/120 |
| 3,450,547 | 6/1969 | Sams et al. | 106/40 R |

*Primary Examiner*—James E. Poer
*Attorney*—Krafft & Wells

[57] ABSTRACT

A method is disclosed by which light and heat-insulating elements, mainly for construction purposes, are manufactured from a mixture of lime and silicates. The method comprises the steps of mixing particles of foamed silicate or glass in a dry or wet state with lime, forming the elements eventually by applying pressure, and hardening the elements in a water vapor-containing atmosphere. The lime is used both in the form of calcium oxide and calcium hydroxide.

7 Claims, No Drawings

METHOD OF PRODUCING LIGHTWEIGHT, HEAT-INSULATING CONSTRUCTION ELEMENTS FROM LIME AND SILICATE AND PRODUCTS THEREOF

CROSS REFERENCE TO RELATED APPLICATIONS

Applicants claim priority under 35 U.S.C. 119 for Application P 19 08 049.0, filed Feb. 18, 1969 in the Patent Office of the Federal Republic of Germany.

Reference is further made to copending U.S. Pat. application Ser. No. 778,800, filed Nov. 25, 1968 now abandoned which in turn is a continuation-in-part of application Ser. No 534,431, filed Mar. 15, 1966, now abandoned and assigned to the same assignee as the present application.

BACKGROUND OF THE INVENTION

It is well known in the prior art to make sandlime stones from sand and lime by forming the stones in a water vapor atmosphere and applying a pressure which ranges approximately between 128 and 242 lbs./sq. in. (9 – 17 atmospheres). Such stones are highly resistant to crushing and are also good heat conductors.

Further, there are lightweight sandlime stones known which are manufactured in various ways. For example, by pressing cavities in the stones made from the mentioned raw material of lime and sand, or by adding light aggregate material such as diatomite and/or coal ash, or by forming a moist plastic material consisting of lime and diatomite without pressure and subsequently hardening the formed stones. In such manner lightweight stones are obtained of which the specific weight ranges between 0.5 to 1.3 g./cu. centimeter.

Still other stones, so called quick ash lime stones, are made of a mixture of quick lime and quick coal ash by slackening the lime, pressing the mixture and hardening the stones in a high pressure water vapor atmosphere. Such a method is disclosed in "Encyclopedia of Technical Chemistry", III. Edition, Volume IV, page 209, Munich 1953, by Ullmann.

Further, there are known methods of producing steam-hardened porous sandlime stones wherein the porous structure is obtained by adding aluminum powder to the wet sand/lime mixture prior to the steam-hardeding production process.

Bearing in mind these prior art methods of producing sandlime stones, it is an object of the present invention to further develop the art of making stones for construction purposes. It is a particular object to provide a method of making a non-inflammable, heat-insulating and lightweight building material.

SUMMARY OF THE INVENTION

The above-stated objects are attained by combining foamed silicate particles and lime in the presence of water vapor. Applicants have discovered that excellent heat-insulating construction elements can be obtained from a method comprising the steps of mixing natural or artificial foamed silicate particles with lime, forming the elements under pressure, if such pressure is necessary for maintaining the shape, and hardening the elements in an atmosphere containing water vapor. Hardening is the result of a chemical reaction between the foamed silicate particles and the lime, during which process the silicate particles become completely or at least partially dissolved.

Natural or artificial foamed silicate particles are preferably used which are absorbent or less resistant to water and are of spherical shape.

According to the invention, the foamed silicate or glass particles are mixed with lime in a dry or wet state. Lime is used in the form of calcium oxide $CaO$ or calcium hydroxide $Ca(OH)_2$. After mixing, the elements are formed or pressed to the desired shape and are then hardened in a water vapor atmosphere. The lime, together with the foamed silicate particles, which are totally or at least partially dissolved in the water vapor atmosphere, combine to a foamed calcium hydrosilicate.

The manner of producing the parts and elements is subject to many alterations and variations, for example, by varying the percentages of lime and silicate in the basic composition, or by adding to the dry or wet composition further filling materials which participate more or less in the chemical reaction. Such filling materials consist of other calcium compounds and/or silicates and/or oxides of metals or metalloids.

Moreover, variations in the production time of the elements are achieved by either hardening the elements in water vapor at pressures above the atmoshperic or below the atmospheric in a vacuum, or in an atmosphere consisting of water vapor and other gases at the same water vapor partial pressure.

When shaping the elements under pressure, such pressure must be adjusted to the foamed silicate material in the mixture. Normally pressures less than 140 lbs./sq. in. (10 atmospheres) above the atmospheric will be sufficient. However, in extreme situations pressures of up to 1,400 lbs./sq. in. (100 atmospheres) or more above the atmospheric are required.

The foamed silicate particles used in the precess should preferably be highly absorbent and less resistant to water, as a consequence whereof they readily react with the water vapor atmosphere. Examples of particles which are highly absorbent and less resistant to water are disclosed in U. S. Pat. Ser. No. 778,800 to which reference has already been made, and particles of alkaline silicates with or without a swelling agent. However, other foamed silicate particles of natural or artificial nature are also suitable.

Further, it proves advantageous to dry the porous calcium hydrosilicate elements additionally after processing, with the application of heat. At temperatures above 950° F. (500° C.), i.e. at temperatures at which sandlime stones lose their strength and compactness as a result of water evaporation, a non-inflammable, insulating material which is resistant to melting up to approximately 2,000°F. (1,100° C.) is thus obtained from the mixed ingredients of lime and foamed glass particles.

Elements made according to the described method are vastly water-insoluble and non-inflammable. Their specific weight ranges between 0.1 – 1.0 g./cu. centimeters. They are capable of being sawed and milled, and also holes can be drilled into them. Owing to their extremely high thermal insulation value they may with good results be applied as building material for the heat insulation of houses, edifices etc. The elements cement well with all binding agents that are customary in construction engineering, and this is a particular advantage. They can be formed to any desired shape, and in simple manner plates, bowls, and all types of profiles may be manufactured.

DESCRIPTION OF THE PREFERRED EMBODIMENTS

According to U.S. Pat. application Ser. No. 778,800, granular fillers are produced by:

a. dissolving a fibrous inorganic silicate in aqueous alkali metal silicate solution in the proportion of 0.02 – 0.7 parts by weight fibrous inorganic silicate to one part of the aqueous alkali metal silicate;

b. drying the solution;

c. granulating the product;

d. coating the granules with a substance having a high melting point such as lime; and e. heating the coated product between about 600° – 1000° C.

Fillers with excellent heat and sound insulating properties are produced by this method having an apparent specific gravity within the range of 0.05 – 0.30 g./cm³.

The foamed glass particles disclosed in the application include those occurring in nature (such as, for example, pumice in granulated form, or perlite), and also synthetically manufactured products of a conventional type. The synthetically manufactured products are prepared by:

1. grinding glass to a maximum particle size of 100 $\mu$;
2. adding expanding agents to the powdered glass, such as, for example, carbon black and sulfate, as well as mixing;

3. granulating the mixture with the addition of a binder, e.g. dilute water glass;

4. drying the granulated material at temperatures of 100° – 150° C.; and 5. foaming at temperatures of above 700° to a maximum of 1,500° C.

Specific examples of the filling materials consist of:

a. other calcium compounds such as calcium carbonates and calcium sulfates; b. other silicates such as rock flour and slag flour;

c. oxides of metals such as aluminum oxide, iron oxides, manganese oxides, lead oxides, zinc oxide and other metallic oxides contained in cements; and d. oxides of metalloids such as silicon dioxide and oxides of arsenic, antimony and boron.

Up to 75 weight percent of foamed silicate granulate may be replaced by these filling materials.

The present process is carried out with the variables preferably as follows:

a. weight ratio of granulate material to lime is 50 to 90 percent granulate to 5 to 50 percent lime (based on CaO);

b. the amount of water used based on CaO is 100 to 1,000 weight percent (weight ratio 1:1 to 1:10);

c. the molding pressure is varied from 0.01 to 1,000 kg./cm.$^2$;

d. the conditioning time in the saturated water vapor (steam) atmosphere is varied from 1 to 120 hours;

e. the pressure in the saturated water vapor atmosphere is varied between 0.1 to 20 kg./cm$^2$;

f. the temperature in the saturated water vapor atmosphere is varied between 40° and 250° C.; and g. the porous calcium hydrosilicate element produced has a specific weight of 0.1 to 1.0 g./cm$^3$.

Without further elaboration, it is believed that one skilled in the art can, using the preceding description, utilize the present invention to its fullest extent.

EXAMPLE 1

160 g. of wet granulate according to application Ser. No. 778,800 are mixed with 40 g. (25 percent by weight) of dry CaO. The mixture is thereafter molded to the required shape under a pressure of 64 lbs./sq.in. (4.5 kg./sq.cm.) and is subsequently for 48 hours stored in a saturated atmosphere of water vapor at a temperature of 176° F. (80° C.).

After this process cavities have formed in the place where formerly the foamed glass particles were located, and from the mixture of CaO and the foamed glass particles has resulted a porous calcium hydrosilicate element having a specific weight of 0.21 g./cm.$^3$, which element is permanent to size and shape even at temperatures up to 932° F. (500° C.).

EXAMPLE 2

100 grams of foamed glass particles produced from powdered glass mixed with expanding agents, which is granulated, dried, and foamed with the addition of bonding liquids (e.g., water glass) having a piled density of 90 g./l. are mixed with 20 g. of CaO and 30 g. of diatomite in the dry state. The mixture is thereafter moistened with 200 cm.$^3$ of water. The resulting mass is poured into a mold and left to dry for 24 at normal temperatures of approximately 77° F. (25° C.).

The dried elements are subsequently stored in a pressure tank containing a saturated water vapor atmosphere at a pressure of about 17 lbs./in.$^2$ (1.2 atmospheres). After 36 hours both the foamed glass particles and the diatomaceous earth have reacted with the calcium oxide from which reaction a solid porous element resulted consisting mainly of calcium hydrosilicate having a specific weight of approximately 0.5 g./cm.$^3$.

EXAMPLE 3

The method is performed as described in example 2, however, instead of applying a water vapor pressure only slightly above the atmospheric, this pressure is raised to 54.7 lbs./in.$^2$ (4 atmospheres). The relatively long reaction time of 36 hours is thereby reduced to 18 hours.

We claim:

1. A method of producing lightweight, heat-insulating shaped bodies comprising:

A. preparing foamed glass particles by
        a. dissolving about 0.02 to 0.7 parts by weight of fibrous inorganic silicate in one part by weight of an aqueous alkali metal silicate solution;
        b. evaporating the mixture to a water content of about 5 – 20 percent by heating;
        c. granulating the dried material to a particle size between about 0.5 – 20 mm;
        d. coating the granulated material with a dispersion of a high melting inorganic compound having a melting point between about 1,200° to 2,500° C.;
        e. heating the coated material between about 600° to 1,000° C. producing foamed glass particles;
    B. mixing about 50 to 90 percent by weight of said foamed glass particles with about 5 to 50 percent by weight of lime, based on CaO, and about 100 to 1,000 percent by weight of water based on CaO;
    C. molding the mixture under a pressure of from about 0.01 to 1,000 kg./cm.$^2$ to form a shaped body; and
    D. conditioning the shaped body in a saturated water vapor atmosphere for about 1 to 120 hours at a temperature of about 40° to 250° C. and under a pressure of about 0.1 to 20 kg./cm.$^2$ to produce a calcium hydrosilicate element having a specific weight of about 0.1 to 1.0 g./cm.$^3$.

2. A method as claimed in claim 1, wherein a filling material is added to said silicate/lime mixture which filling material participates in said chemical reaction.

3. A method as claimed in claim 2, wherein said filling material consists essentially of the silicates of metals or metalloids.

4. A method as claimed in claim 2, wherein said filling material consists essentially of the oxides of metals or metalloids.

5. The method of claim 1, further comprising heat treating said calcium hydrosilicate element at a temperature above 500° C.

6. The method of claim 1, wherein said lime is 25 percent by weight based on CaO, the molding pressure is about 4.5 kg. per sq. cm. and the shaped body is conditioned for about 48 hours in a saturated water vapor atmosphere at a temperature of about 80° C.

7 A method of producing lightweight heat insulating shaped bodies comprising the steps of mixing foamed glass particles having a piled density of about 90 g./l. with 20 percent by weight of CaO and 30 percent by weight of diatomaceous earth, moistening said mixture with 200 cubic centimeters of water, pouring the mixture in a mold, drying it for 24 hours at normal temperatures of approximately 25° C., and storing it for 36 hours in a pressure tank in a saturated water vapor atmosphere under a pressure of approximately 1.2 atmospheres.

* * * * *